United States Patent
Akatsuka et al.

(10) Patent No.: US 10,236,751 B2
(45) Date of Patent: Mar. 19, 2019

(54) METHOD OF MANUFACTURING STATOR CORE

(71) Applicant: TOSHIBA INDUSTRIAL PRODUCTS AND SYSTEMS CORPORATION, Kawasaki-shi, Kanagawa (JP)

(72) Inventors: Takayuki Akatsuka, Mie (JP); Toyonobu Yamada, Mie (JP); Tadashi Morishima, Mie (JP); Tooru Yamagiwa, Mie (JP); Chidai Isaka, Mie (JP); Motoyasu Mochizuki, Mie (JP); Takashi Hanai, Mie (JP); Youichi Seo, Mie (JP)

(73) Assignee: TOSHIBA INDUSTRIAL PRODUCTS AND SYSTEMS CORPORATIO, Kawasaki-Shi (JP)

( * ) Notice: Subject to any disclaimer, the term of this patent is extended or adjusted under 35 U.S.C. 154(b) by 196 days.

(21) Appl. No.: 15/080,881

(22) Filed: Mar. 25, 2016

(65) Prior Publication Data
US 2016/0211732 A1    Jul. 21, 2016

Related U.S. Application Data (63) Continuation of application No. PCT/JP2014/066163, filed on Jun. 18, 2014.

(30) Foreign Application Priority Data

Sep. 27, 2013   (JP) ................................. 2013-201455

(51) Int. Cl.
  *H02K 15/02*   (2006.01)
(52) U.S. Cl.
  CPC ........... *H02K 15/02* (2013.01); *H02K 15/024* (2013.01)

(58) Field of Classification Search
  CPC .... H02K 1/2773; H02K 15/03; H02K 15/024; Y10T 29/49012
  See application file for complete search history.

(56) References Cited

U.S. PATENT DOCUMENTS

| | | | |
|---|---|---|---|
| 3,650,167 A | 3/1972 | Hoffmeyer et al. | |
| 4,318,218 A * | 3/1982 | Nelson ................... | H02K 1/185 29/596 |

(Continued)

FOREIGN PATENT DOCUMENTS

| | | |
|---|---|---|
| CN | 1578058 | 2/2005 |
| CN | 1756028 | 4/2006 |

(Continued)

OTHER PUBLICATIONS

English Language Abstract of JP 58-201549 published on Nov. 24, 1983.

(Continued)

*Primary Examiner* — Minh Trinh
(74) *Attorney, Agent, or Firm* — DLA Piper LLP (US)

(57) ABSTRACT

A method of manufacturing a stator core includes punching out core members from an electrical steel sheet in three rows arrangement side by side along a width direction of the electrical steel sheet. Each of the core members has connecting projections. The connecting projections project radially outward from an outer periphery of the core member. The punched out core members are stacked to form the stator core. Each of the core members in two of the three rows arrangement have a connecting projection angled at a first angle from the width direction of the electrical steel sheet. Each of the core members in a third row having a connecting projection angled at a different second angle from the width direction of the electrical steel sheet.

4 Claims, 9 Drawing Sheets

(56) References Cited

U.S. PATENT DOCUMENTS

| | | | | |
|---|---|---|---|---|
| 4,536,952 | A | | 8/1985 | Shinryo et al. |
| 5,005,281 | A | * | 4/1991 | Burns .................. H02K 15/024 29/596 |
| 5,044,237 | A | * | 9/1991 | Frame .................... B21D 28/22 29/598 |
| 7,298,064 | B2 | * | 11/2007 | Yamamoto ............... H02K 1/02 29/598 |
| 2005/0229384 | A1 | * | 10/2005 | Yamamoto ............. H02K 15/02 29/598 |
| 2006/0071572 | A1 | | 4/2006 | Kunkel |
| 2009/0064485 | A1 | | 3/2009 | Kunkel |
| 2011/0024489 | A1 | | 2/2011 | Sakakibara |
| 2013/0293060 | A1 | | 11/2013 | Hasuo et al. |
| 2014/0091672 | A1 | | 4/2014 | Yamada et al. |
| 2016/0211732 | A1 | * | 7/2016 | Akatsuka ............. H02K 15/024 |

FOREIGN PATENT DOCUMENTS

| | | |
|---|---|---|
| JP | 53-080503 | 7/1978 |
| JP | 58-201549 | 11/1983 |
| JP | 01-321848 | 12/1989 |
| JP | 2005-318763 | 11/2005 |
| JP | 2006-109691 | 4/2006 |
| JP | 2006-280017 | 10/2006 |
| JP | 2007-181297 | 7/2007 |
| JP | 2009-195031 | 8/2009 |
| JP | 2009-254086 | 10/2009 |
| JP | 2011-036039 | 2/2011 |
| JP | 2011-078210 | 4/2011 |
| JP | 2012-170222 | 9/2012 |
| JP | 2012-178920 | 9/2012 |

OTHER PUBLICATIONS

English Language Abstract and Translation of JP 2011-036039 published on Feb. 17, 2011.
English Language Abstract and Translation of JP 2006-109691 published on Apr. 20, 2006.
English Language Abstract of JP 01-321848 published on Dec. 27, 1989.
English Language Abstract and Translation of JP 2007-181297 published Jul. 12, 2007.
International Search Report (with English Translation) issued in PCT/JP2011/074143 dated Dec. 13, 2011.
Written Opinion (with English Translation) issued in PCT/JP2011/074143 dated Dec. 13, 2011.
Japanese Office Action (with English Translation) issued in JP 2011-039882 dated Sep. 3, 2013.
Japanese Office Action (with English Translation) issued in JP 2011-039882 dated Oct. 11, 2013.
English Language Abstract and Translation of JP 2009-254086 published on Oct. 29, 2009.
English Language Abstract and Translation of JP 2005-318763 published on Nov. 10, 2005.
English Language Abstract and Translation of JP 2012-170222 published on Sep. 6, 2012.
Mexican Office Action issued in MX/a/2013/009747 dated Aug. 7, 2014.
First Notification of Opinion on Examination (with English Translation) issued in Chinese Application No. 201180068497.5 dated Apr. 3, 2015.
Notification of Opinion on Examination (with English Translation) issued in Chinese Application No. 201180068497.5 dated Oct. 21, 2015.
International Search Report (with English Translation) issued in PCT/JP2014/066163 dated Sep. 2, 2014.
Written Opinion (with English Translation) issued in PCT/JP2014/066163 dated Sep. 2, 2014.
International Preliminary Report on Patentability issued in PCT/JP2014/066163 dated Mar. 29, 2016.
U.S. Appl. No. 14/010,432.
English Language Abstract and Translation of JP 2012-178920 published on Sep. 13, 2012.
English Language Abstract and Translation of JP 2006-280017 published on Oct. 12, 2006.
English Language Abstract and Translation of JP 2011-078210 published on Apr. 14, 2011.
English Abstract of JP 53-080503 published Jul. 17, 1978.
English Language Abstract and Translation of CN 1756028 published on Apr. 5, 2006.
English Language Abstract and Translation of CN 1578058 published on Feb. 9, 2005.
English Language Abstract and Translation of JP 2009-195031 published Aug. 27, 2009.

\* cited by examiner

METHOD OF MANUFACTURING STATOR CORE

CROSS REFERENCE TO RELATED APPLICATIONS

This application is a Continuation of International Application No. PCT/JP2014/066163 filed Jun. 18, 2014, which claims priority from Japanese Patent Application No. 2013-201455 filed Sep. 27, 2013.

TECHNICAL FIELD

An embodiment of the present invention relates to a method of manufacturing a stator core.

BACKGROUND ART

A stator core for a stator of an electric rotary motor is formed, for example, by stacking a multiplicity of annular core members. For example, each of core members of a stator core used in a motor mounted on a hybrid motor vehicle has at its outer periphery a plurality of projections projecting radially outward from the outer periphery. A hole is formed in each projection. A connecting member is inserted through the holes in the core members to connect the core members. Each core member is formed by being punched out from an electrical steel sheet in band form with a press, for example, as described in Patent Literature 1.

CITATION LIST

Patent Literature

Patent Literature 1: Japanese Patent Laid-Open No. 2012-178920

SUMMARY OF INVENTION

Technical Problem

In manufacturing of the core member having projections at its outer periphery, there is a tendency to leave a large amount of the material around the region in the electrical steel sheet where the projection of the core member is punched out as compared to when circular core members are employed that have no projections. Therefore the yield of the material is reduced. Moreover, the remainder of the electrical steel sheet remaining after punching has an irregular shape, resulting in difficulty in stabilizing the production.

In an embodiment of the present invention, a method of manufacturing a stator core formed by stacking core members each having projections at its outer periphery enables improved yield of a material used to manufacture the stator core.

Solution to Problem

According to an embodiment of the present invention, a method of manufacturing a stator core includes punching out, from an electrical steel sheet in band form, core members each having a plurality of connecting projections projecting radially outward from its outer periphery. Portions of the electrical steel sheet from which the core members are punched out are arranged in three rows placed side by side along the width direction of the electrical steel sheet. Two of the three rows of core members have projections inclined through a first angle from the width direction of the electrical steel sheet. Each of the core members in the remaining row have projections inclined through a second angle different from the first angle from the width direction of the electrical steel sheet.

DESCRIPTION OF EMBODIMENTS

A plurality of embodiments of the method of manufacturing a stator core used in a stator of an electric rotary motor will be described with reference to the drawings. In this case, the stator is a stator of an inner-rotor type motor. The axial direction of a stator core, the direction of stacking of core members and the direction of plate thickness of the core members coincide with each other.

First Embodiment

Figure 1:
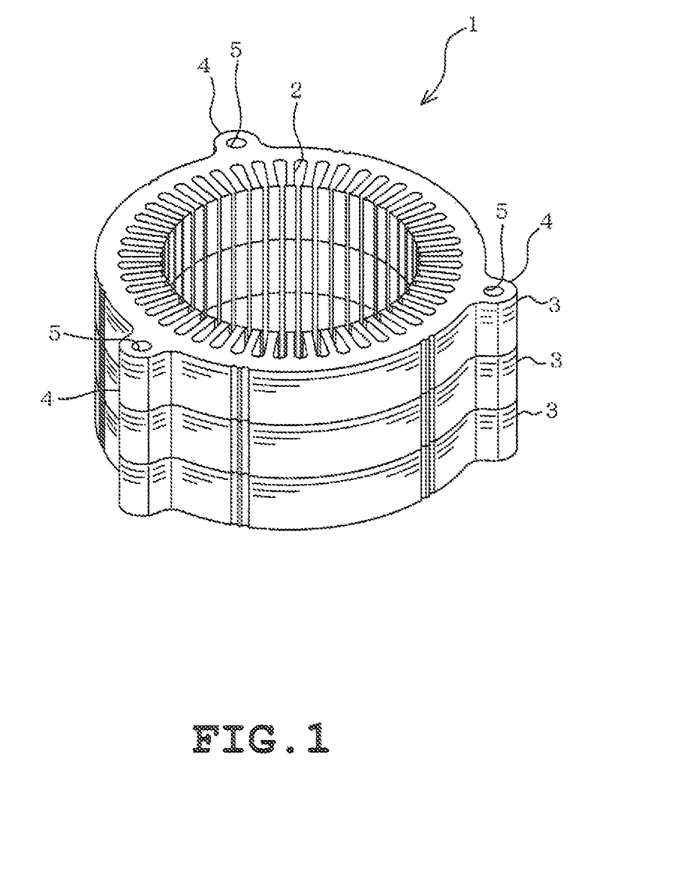
FIG. 1 is a perspective view showing an example of an appearance of a stator core according to a first embodiment.

For example, a stator core 1 shown in FIG. 1 is formed of electrical steel sheets and has a generally cylindrical shape. A space in which a rotor (not shown in the figure) is disposed is formed on the inner periphery of the stator core 1. A plurality of slots 2 for housing windings are formed at equal intervals along the circumferential direction at the inner periphery of the stator core 1. The stator core 1 is used by being fixed in a frame (not shown) in which the electric rotary motor is housed. The stator core 1 is formed by stacking a multiplicity of core members 3.

Each core member 3 is a generally annular sheet. A plurality of slots 2 extending inwardly are formed at equal intervals along the circumferential direction at the inner periphery of the core member 3. Both of the slots 2 in the stator core 1 and the slots 2 in the core members 3 are referred to as "slots 2" for ease of description. Each of the plurality of core members 3 has m number of projections 4 for connecting the core members 3 integrally with each other in the direction of stacking when the plurality of core members 3 are stacked. The number "m" is set to an "integer equal to or larger than 2", preferably an "odd number equal to or larger than 3", more preferably "3". In the present embodiment, "m=3" is set. That is, one core member 3 has three projections 4.

The projections 4 project radially outward from the outer periphery of the annular core member 3. More specifically, the projections 4 are identical in shape to each other. In this case, each projection 4 extends radially outward from the outer periphery of the core member 3 and has its distal end formed into a semicircular shape. Each projection 4 is formed in such a size that a hole 5 described below can be formed therein. The projections 4 are disposed at equal intervals along the circumferential direction at the outer periphery of the circular core member 3. Since "m=3" in this case, the interval between the projections 4 is "360/3"°, i.e., "120°".

A circular hole 5 is formed at a center of each projection 4 so as to extend through the projection 4 in the sheet thickness direction of the core member 3. The stator core 1 is formed by stacking the multiplicity of core members 3 in the sheet thickness direction so that the projections 4 of the core members 3 are superposed one on another. At this time, the holes 5 of the plurality of core members 3 in each adjacent pairs of the core members 3 in the sheet thickness direction of the core members 3, i.e., the direction of stacking, communicate with each other and form a cylindrical shape along the direction of stacking. Connecting members not shown are inserted in the holes 5 communicating with each other in the direction of stacking of the core members 3. Each connecting member is formed, for example, of a binding tube made of a metal. Accordingly, the opening size of the holes 5 is set to such a value that the connecting members, the binding tubes in this case, can be inserted in the holes 5. The binding tubes inserted in the holes 5 are expanded at any position through the total length of the holes 5 in the stacking direction, thereby integrally connecting the multiplicity of core members 3 so that the stator core 1 is formed.

Figure 2:
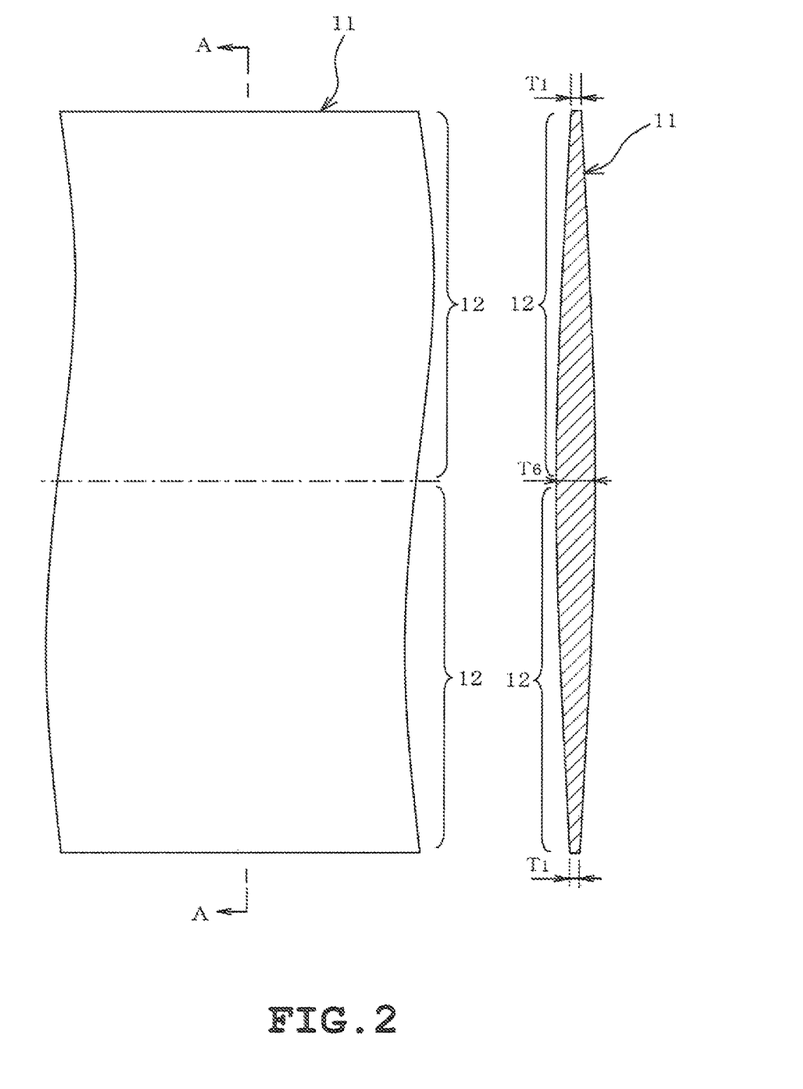
FIG. 2(a) is a plan view of an electrical steel sheet.
FIG. 2(b) is a sectional view taken along line A-A in FIG. 2(a).

An example of a method of manufacturing the stator core 1 according to the present embodiment will subsequently be described. The core members 3 constituting the stator core 1 are formed by cutting a sheet of parent material 11, e.g., the electrical steel sheet in band form shown in FIG. 2 into pieces of a predetermined size and by punching these pieces of parent material sheet 11 with a press not illustrated. The parent material sheet 11 is formed in band form by rolling. The parent material sheet 11 therefore varies in thickness, for example, with respect to different positions along thickness direction, depending on variations in the magnitude of load received from rollers during rolling. That is, the parent material sheet 11 has a sheet thickness deviation. In this case, the parent material sheet 11 is thick at a center in the width direction and is minimized in thickness at opposite ends. For ease of description, the sheet thickness of the opposite ends in the width direction, i.e., the thinnest portions, of the parent material sheet 11 is indicated by "T1" and the sheet thickness of a portion at the center in the width direction, i.e., the thickest portion, of the parent material sheet 11 is indicated by "T6". The width direction of the parent material sheet 11 is the same as the axial direction of the rollers used in rolling.

In the present embodiment, a cutting step of cutting the parent material sheet 11 into a suitable size is first performed. In this cutting step, the parent material sheet 11 is cut into pieces having a predetermined size in the width direction. In the present embodiment, the parent material sheet 11 is cut into two with reference to the center in the width direction. Two sheets of worked parent material sheet 12 in band form are obtained thereby. That is, each worked parent material sheet 12 is an electrical steel sheet in band form having half the size of the parent material sheet 11 in the width direction. Accordingly, the sheet thickness of the worked parent material sheet 12 at one end in the width direction is "T1" while the sheet thickness of the worked parent material sheet 12 at the other end in the width direction is "T6". Each of the worked parent material sheets 12 obtained by cutting the parent material sheet 11 in the above-described way is handled by being wound in a coil.

Subsequently, a punching step of punching out core members 3 and other members from the worked parent material sheets 12 is performed. A facility for executing this punching step, not illustrated, includes an uncoiler in which the worked parent material sheet 12 wound in a coil is set and which pays out the worked parent material sheet 12, a feeder which supplies to a press machine the worked parent material sheet 12 paid out from the uncoiler while straightening the curl of the worked parent material sheet 12, and the press machine for punching out core members 3 and other members by pressing from the worked parent material sheet 12 supplied by the feeder.

The press machine has a plurality of dies for punching, not illustrated. Each die has a cutting blade corresponding to the punched shape of the core member 3 and other members. The press machine has groups of dies each consisting of a plurality of rotor core dies for punching out core members constituting a rotor core not illustrated, and a plurality of stator core dies for punching out the core members 3 constituting the stator core. The construction of the press machine is such that the groups of dies are arranged in three rows placed side by side along the width direction of the worked parent material sheet 12. In each group of dies, the plurality of rotor core dies or the plurality of stator core dies are arranged in one row along the direction in which the worked parent material sheet 12 runs, i.e., the lengthwise direction of the worked parent material sheet 12. The worked parent material sheet 12 is successively fed to the plurality of dies arranged along the lengthwise direction of the worked parent material sheet 12 and is pressed with the dies, thereby successively punching out the core members for the rotor core and the core members 3 for the stator core from the worked parent material sheet 12. The press machine has three dies identical in shape to each other placed along the width direction of the worked parent material sheet 12. By a pressing operation with the press machine, therefore, three core members for the rotor core can be obtained from the worked parent material sheet 12 at a time, and three core members 3 for the stator core can also be obtained at a time.

Figure 3:
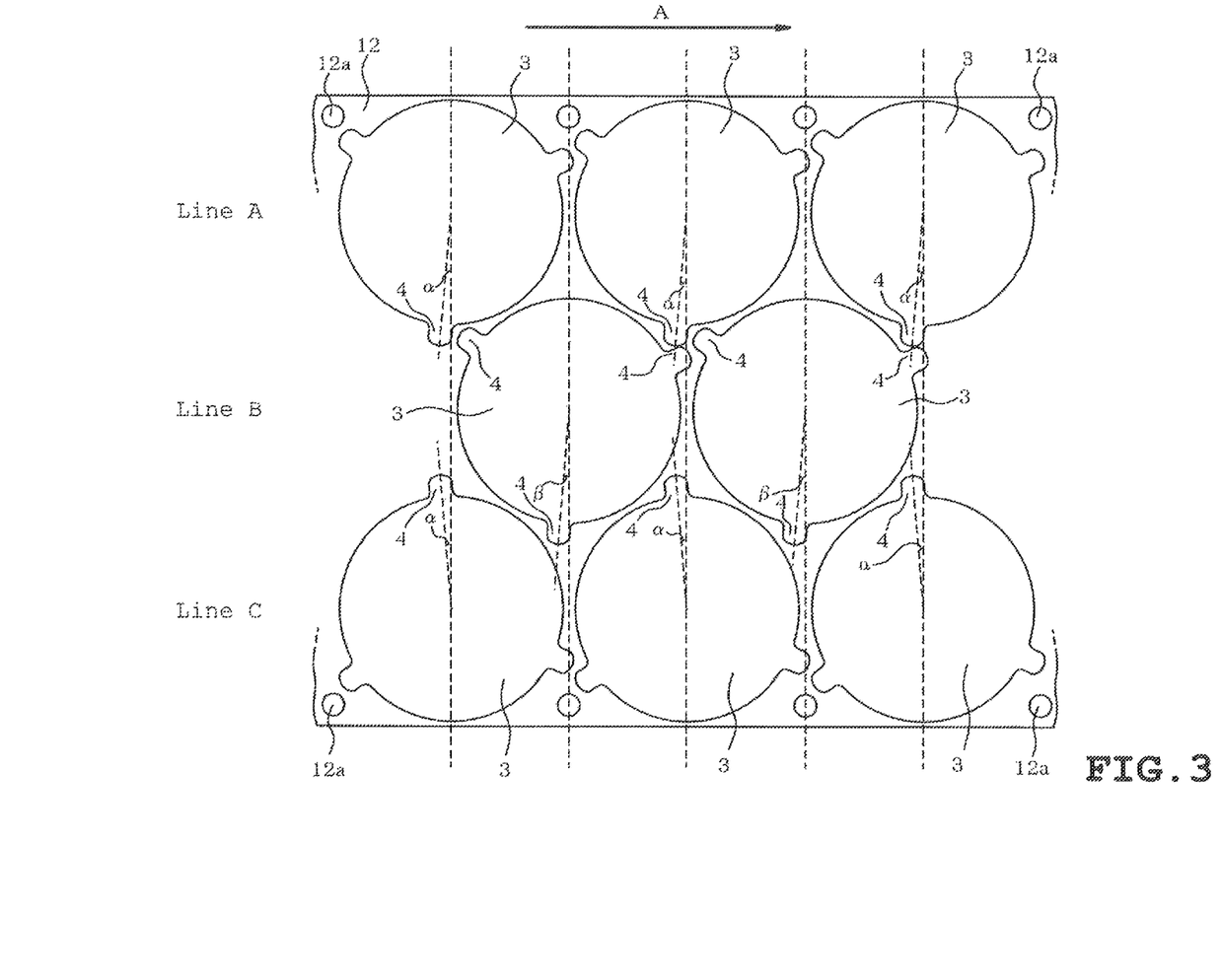
FIG. 3 is a diagram (part 1) showing an example of a layout of dies for punching out core members for the stator core.
Figure 4:
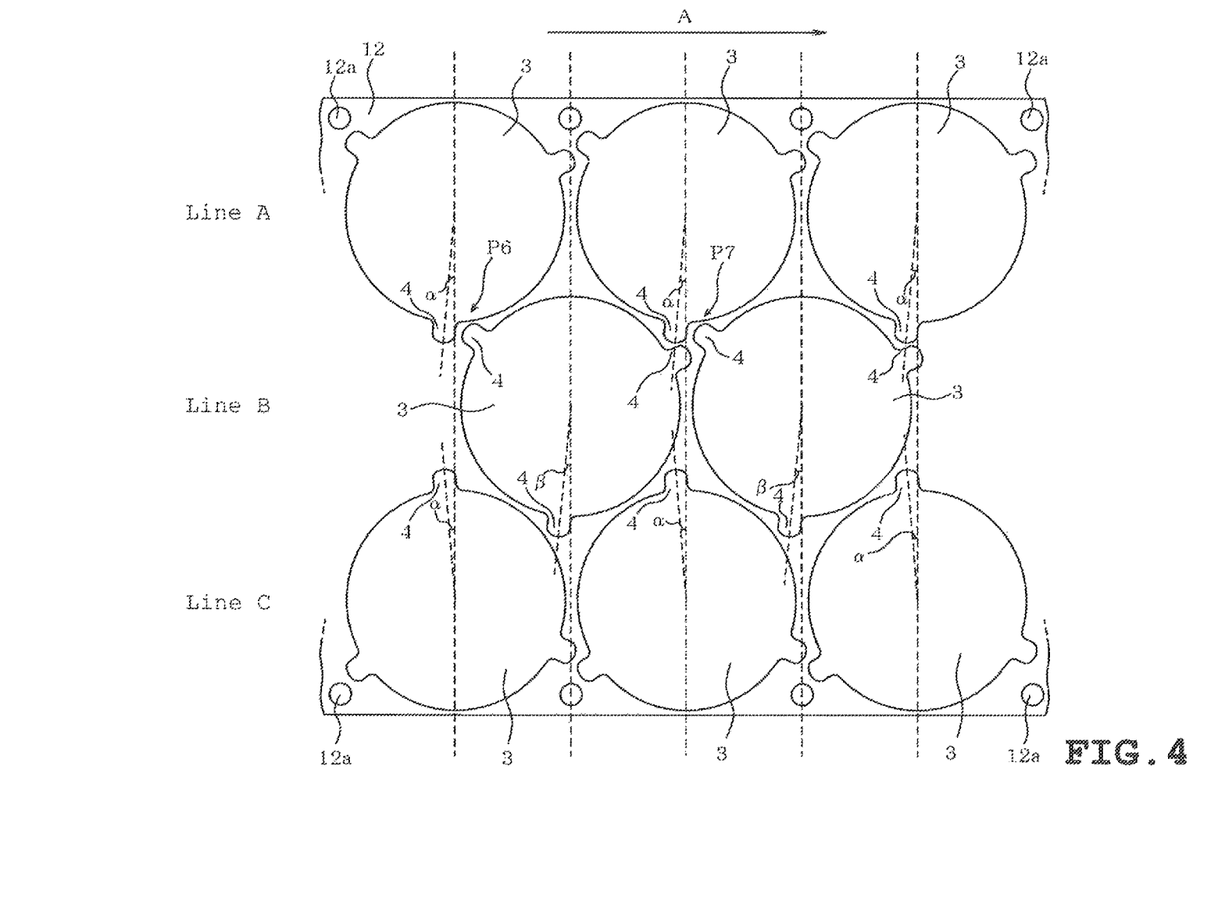
FIG. 4 is a diagram (part 2) showing an example of a layout of dies for punching out the core members for the stator core.

FIGS. 3 and 4 show an example of a layout of dies for punching out the core members 3 for the stator core from the worked parent material sheet 12. In FIGS. 3 and 4, the left-hand side is the upstream side with respect to the direction in which the worked parent material sheet 12 runs in the punching step, and the right-hand side is the downstream side. That is, the worked parent material sheet 12 runs in the direction of arrow A. As illustrated in FIGS. 3 and 4, the portions of the worked parent material sheet 12 from which the core members 3 for the stator core are punched out are arranged in three rows placed side by side along the width direction of the worked parent material sheet 12. Also, the press machine is arranged to manufacture the core members for the rotor core and the core members 3 for the stator core by successively punching the worked parent material sheet 12 at a predetermined position while successively feeding the worked parent material sheet 12. Therefore, the core members for the rotor core and the core members 3 for the stator core to be punched out from the worked parent material sheet 12 are punched out in such a manner that the core members in one row are obtained in the same shape. Pilot holes 12a for matching of the pitch with which the worked parent material sheet 12 is fed are provided in opposite end portions in the width direction of the worked parent material sheet 12. For ease of description, the uppermost row in the figures is referred to as "row A"; the central row as "row B"; and the lowermost row as "row C".

In the present embodiment, a layout of the dies for punching out the core members 3 for the stator core is devised to improve the yield of the worked parent material sheet 12 provided as material. The embodiment will be described below with respect to details of the layout.

Figure 5:
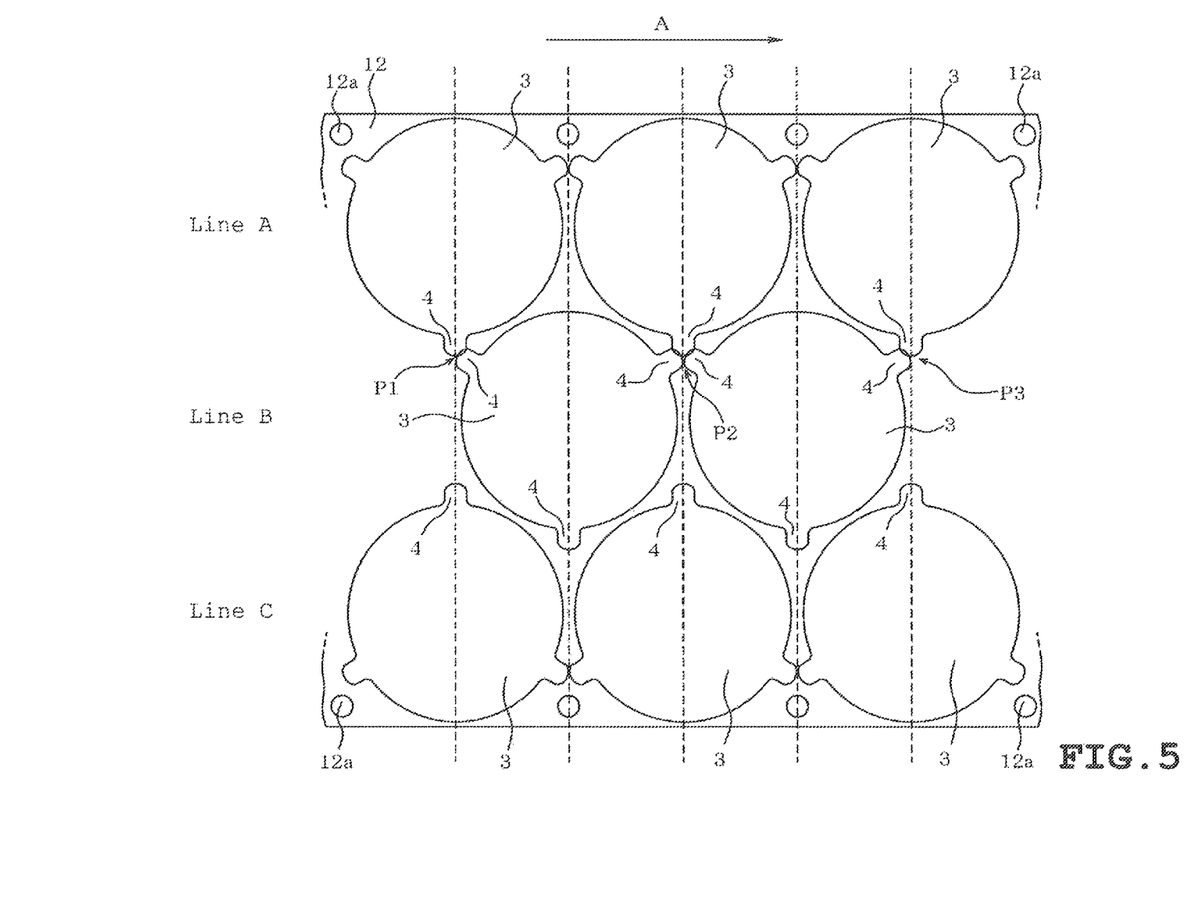
FIG. 5 is a diagram (part 1) showing an example of a conventional layout of dies for punching out the core members for the stator core.

For example, in a conventional layout shown in FIG. 5, the "projections 4" extending between the core members 3, 3 adjacent to each other along the lengthwise direction of the worked parent material sheet 12 in any one of the rows placed side by side along the width direction of the worked parent material sheet 12 in the plurality of projections 4 that the core members 3 for the stator core have in one of the other rows, i.e., the "portions from which the projections 4 are punched out", extend along the width direction of the worked parent material sheet 12 indicated by broken lines in the figure in any one of the rows and are not inclined with respect to the width direction of the worked parent material sheet 12. In this layout, if the spacing between the "core members 3" for the stator core, i.e., the "portions from which the core members 3 are punched out", included in any one of the rows is reduced to improve the yield of the worked parent material sheet 12, the "projections 4" of the core members 3 belonging to different ones of the rows, i.e., the "portions from which the projections 4 are punched out", interfere with each other, for example, at positions P1, P2, and P3.

Figure 6:
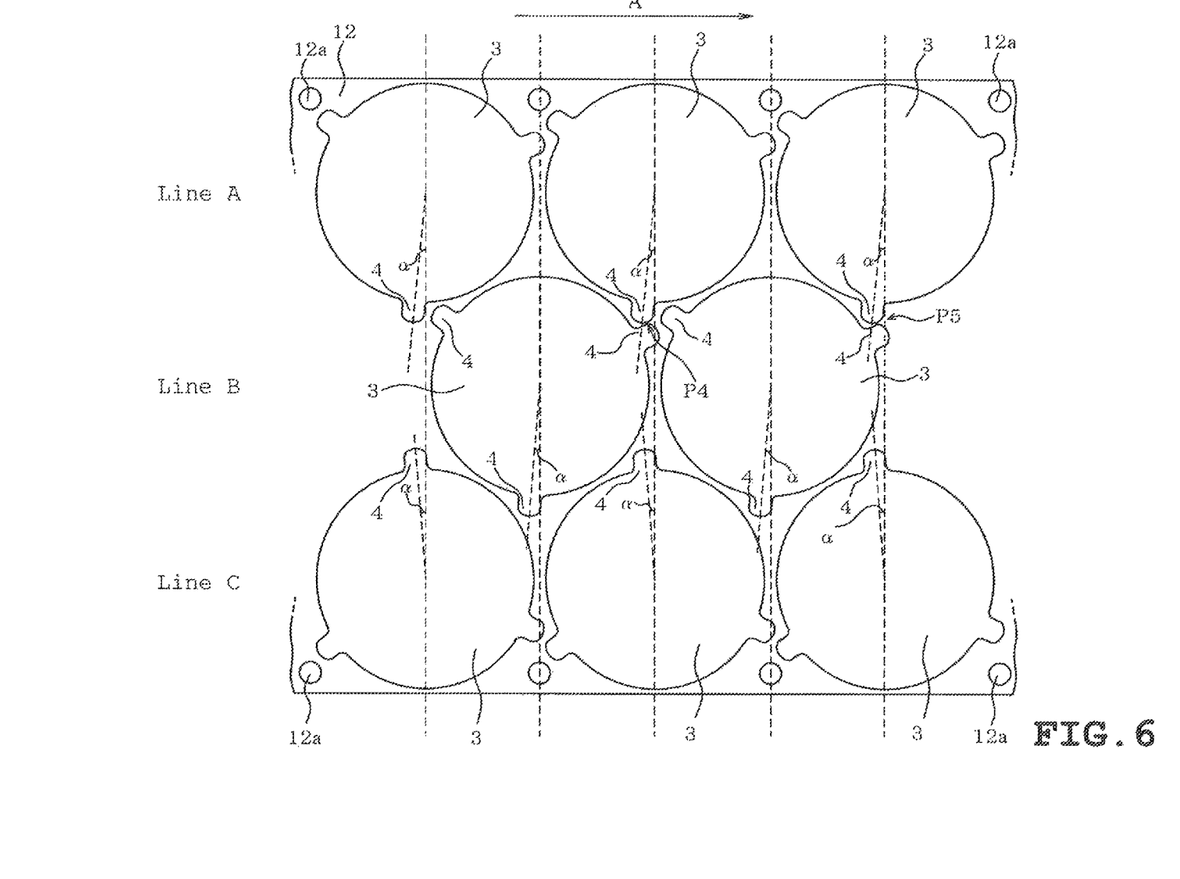
FIG. 6 is a diagram (part 2) showing an example of a conventional layout of dies for punching out the core members for the stator core.

A layout is therefore studied in which, for example, as shown in FIG. 6, the "projections 4" extending between the core members 3, 3 adjacent to each other along the lengthwise direction of the worked parent material sheet 12 in any one of the rows in the plurality of projections 4 that the core members 3 for the stator core included in one of the other rows have, i.e., the "portions from which the projections 4 are punched out", are inclined through a predetermined angle $\alpha$ from the width direction of the worked parent material sheet 12 in any one of the rows. In this case, the "projections 4", i.e., the "portions from which the projections 4 are punched out", are inclined in the direction opposite to the direction of arrow A in which the worked parent material sheet 12 runs. Also in this case, the "projections 4" of the core members 3 belonging to different ones of the rows, i.e., the "portions from which the projections 4 are punched out", interfere with each other, for example, at positions P4 and P5.

A layout shown in FIG. 3 or 4 for example is then studied. The layout illustrated in FIG. 3 or 4 is such that each of the "projections 4" extending between the core members 3, 3 adjacent to each other along the lengthwise direction of the worked parent material sheet 12 in one of the three rows in the plurality of projections 4 that the core members 3 for the stator core included in the other two rows have, i.e., the "portions from which the projections 4 are punched out", is inclined through a predetermined angle $\alpha$ from the width direction of the worked parent material sheet 12. The layout illustrated in FIG. 3 or 4 is also such that each of the "projections 4" extending between the core members 3, 3 adjacent to each other along the lengthwise direction of the worked parent material sheet 12 in one of the two rows in the plurality of projections 4 that the core members 3 for the stator core included in the other one of the three rows have, i.e., the "portions from which the projections 4 are punched out", is inclined through a predetermined angle $\beta$ different from the predetermined angle $\alpha$ from the width direction of the worked parent material sheet 12. The predetermined angle $\alpha$ is an example of the first angle while the predetermined angle $\beta$ is an example of the second angle.

In the layout shown in FIG. 3 for example, each of the "projections 4" extending between the core members 3, 3 adjacent to each other along the lengthwise direction of the worked parent material sheet 12 in one of the rows, the row B in this case in the plurality of projections 4 that the core members 3 for the stator core included in the other two rows formed at the opposite ends in the width direction of the worked parent material sheet 12, i.e., the rows A and C adjacent to the row B, have, i.e., the "portions from which the projections 4 are punched out", is inclined through the predetermined angle $\alpha$ from the width direction of the worked parent material sheet 12. In this case "5°" is set as predetermined angle $\alpha$. In addition, each of the "projections 4" extending between the core members 3, 3 adjacent to each other along the lengthwise direction of the worked parent material sheet 12 in one of the rows, the row C in this case, in the plurality of projections 4 that the core members 3 for the stator core included in one of the rows formed at the center in the width direction of the worked parent material sheet 12, i.e., the row B, have, i.e., the "portions from which the projections 4 are punched out", is inclined through the predetermined angle $\beta$ from the width direction of the worked parent material sheet 12. In this case "6°" is set as predetermined angle $\beta$. In this layout, no portions exist where the "core members 3" belonging to different ones of the rows, i.e., the "portions from which the core members 3 are punched out", interfere with each other or no positions exist at which the "core members 3" or the "portions from which the core members 3 are punched out" are extremely close to each other. As a result, the yield of the worked parent material sheet 12 provided as material can be markedly improved.

In the layout shown in FIG. 4 for example, each of the "projections 4" extending between the core members 3, 3 adjacent to each other along the lengthwise direction of the worked parent material sheet 12 in one of the rows, the row B in this case in the plurality of projections 4 that the core members 3 for the stator core included in the other two rows formed at the opposite ends in the width direction of the worked parent material sheet 12, i.e., the rows A and C adjacent to the row B, have, i.e., the "portions from which the projections 4 are punched out", is inclined through the predetermined angle $\alpha$ from the width direction of the worked parent material sheet 12. In this case "5°" is set as predetermined angle $\alpha$. In addition, each of the "projections 4" extending between the core members 3, 3 adjacent to each other along the lengthwise direction of the worked parent material sheet 12 in one of the rows, the row C in this case in the plurality of projections 4 that the core members 3 for the stator core included in one of the rows formed at the center in the width direction of the worked parent material sheet 12, i.e., the row B, have, i.e., the "portions from which the projections 4 are punched out", is inclined through the predetermined angle $\beta$ from the width direction of the worked parent material sheet 12. In this case "7°" is set as predetermined angle $\beta$. In this layout, the "core members 3" belonging to the row A, i.e., the "portions from which the core members 3 are punched out", and the "projections 4" belonging to the row B different from the row A, i.e., the "portions from which the projections 4 are punched out", are close to each other, for example, at positions P6 and P7, but no portions exist where the "core members 3" belonging to different ones of the rows, i.e., the "portions from which the core members 3 are punched out", interfere with each other. As a result, the yield of the worked parent material sheet 12 provided as material can be markedly improved.

Figure 7:
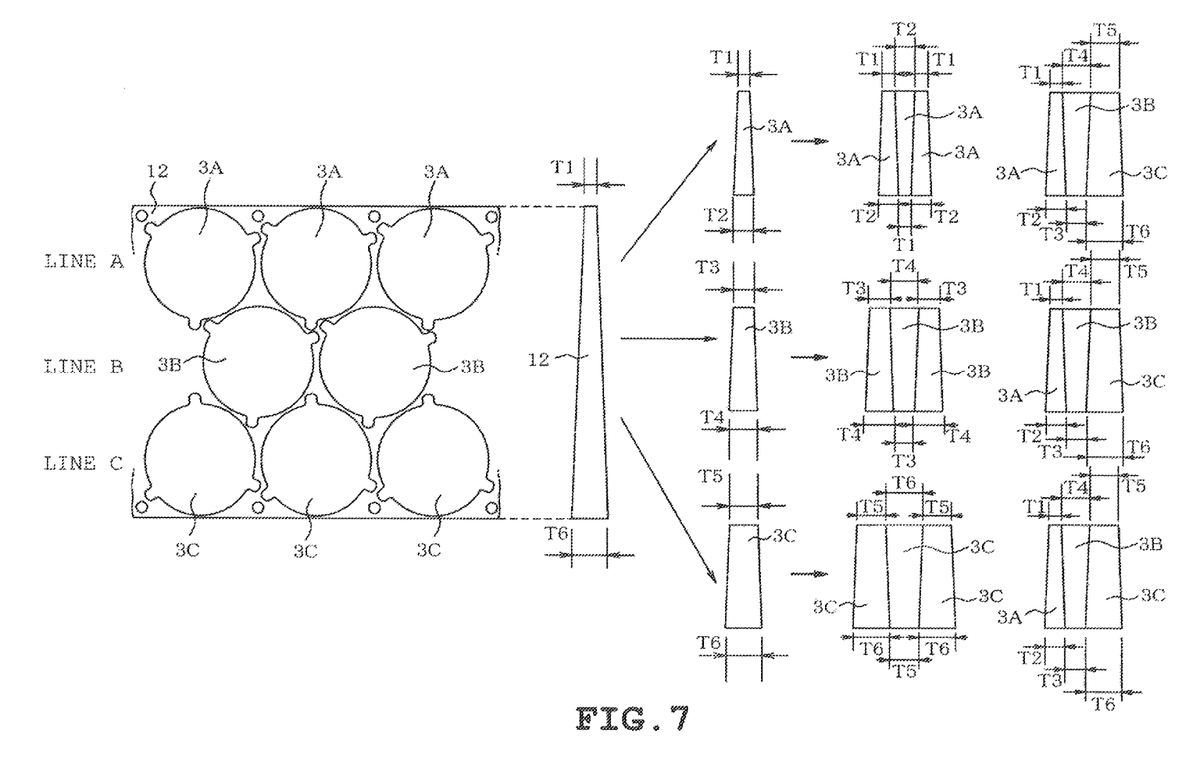
FIG. 7 is a diagram for explaining an example of a stacking step.

A stacking step of stacking the multiplicity of core members 3 punched out in the punching step according to the layout illustrated in FIG. 3 or 4 will subsequently be described. The worked parent material sheet 12 has a sheet thickness deviation, for example, as shown in FIG. 7(*a*). As a result, the core members 3 respectively punched out from the rows A, B, and C vary in sheet thickness depending on the rows from which the core members 3 are punched out, as shown in FIG. 7(*b*). Therefore, if the core members 3 punched out in the respective rows are stacked as shown in FIG. 7(*c*), the thickness of a core member block in the case where only core members 3A punched out from the row A are stacked, the thickness of a core member block in the case where only core members 3B punched out from the row B are stacked and the thickness of a core member block in the case where only core members 3C punched out from the row C are stacked differ from each other.

In the present embodiment, the core members 3A, 3B, and 3C punched out from the rows A, B, and C respectively are combined and stacked in the stacking step, as shown in FIG. 7(*d*), thereby forming core member blocks. Preferably, in this case, the number of core members 3A punched out from the row A, the number of core members 3B punched out from the row B and the number of core members 3C punched out from the row C are set equal to each other. This stacking step enables core member blocks to be made uniform in thickness when manufactured while setting the numbers of stacked core members 3 equal to each other, and hence enables stator cores to be made uniform when manufactured by stacking a multiplicity of the core member blocks.

In the punching step of punching out from the worked parent material sheet 12 in band form the core members 3 each having the plurality of connecting projections 4 projecting radially outward from its outer periphery in the stator core manufacturing method according to the present embodiment, the portions of the worked parent material sheet 12 from which the core members 3 are punched out are arranged in three rows placed side by side along the width direction of the worked parent material sheet 12. Each of the portions which are included in two of the three rows and from which the projections 4 of the core members 3 are punched out is inclined through the predetermined angle α from the width direction of the worked parent material sheet 12 while each of the portions which are included in the remaining one of the rows and from which the projections 4 of the core members 3 are punched out is inclined through the predetermined angle β different from the predetermined angle α from the width direction of the worked parent material sheet 12.

Also, in the present embodiment, each of the portions which are included in the two rows formed at the opposite ends in the width direction of the worked parent material sheet 12 and from which the projections 4 of the core members 3 are punched out is inclined through the predetermined angle α from the width direction of the worked parent material sheet 12. This manufacturing method enables the portions of the worked parent material sheet 12 from which the core members 3 in the rows are punched out to be brought as close as possible to each other while securing a suitable spacing therebetween. Therefore, the area of the portions from which the core members 3 are punched out in the area of the worked parent material sheet 12 can be increased and the amount of the material remaining after punching out the core members 3 can be reduced. Consequently, the yield of the worked parent material sheet 12 provided as material can be markedly improved.

Second Embodiment

Also in the present embodiment, a layout of the dies for punching out the core members 3 for the stator core is devised to improve the yield of the worked parent material sheet 12 provided as material. The embodiment will be described below with respect to details of the layout. A layout shown in FIG. 8 or 9 for example is also such that each of the "projections 4" extending between the core members 3, 3 adjacent to each other along the lengthwise direction of the worked parent material sheet 12 in one of the three rows in the plurality of projections 4 that the core members 3 for the stator core included in the other two rows have, i.e., the "portions from which the projections 4 are punched out", is inclined through the predetermined angle α from the width direction of the worked parent material sheet 12. The layout illustrated in FIG. 8 or 9 is also such that each of the "projections 4" extending between the core members 3, 3 adjacent to each other along the lengthwise direction of the worked parent material sheet 12 in one of the two rows in the plurality of projections 4 that the core members 3 for the stator core included in the other one of the three rows have, i.e., the "portions from which the projections 4 are punched out", is inclined through the predetermined angle β different from the predetermined angle α from the width direction of the worked parent material sheet 12.

Figure 8:
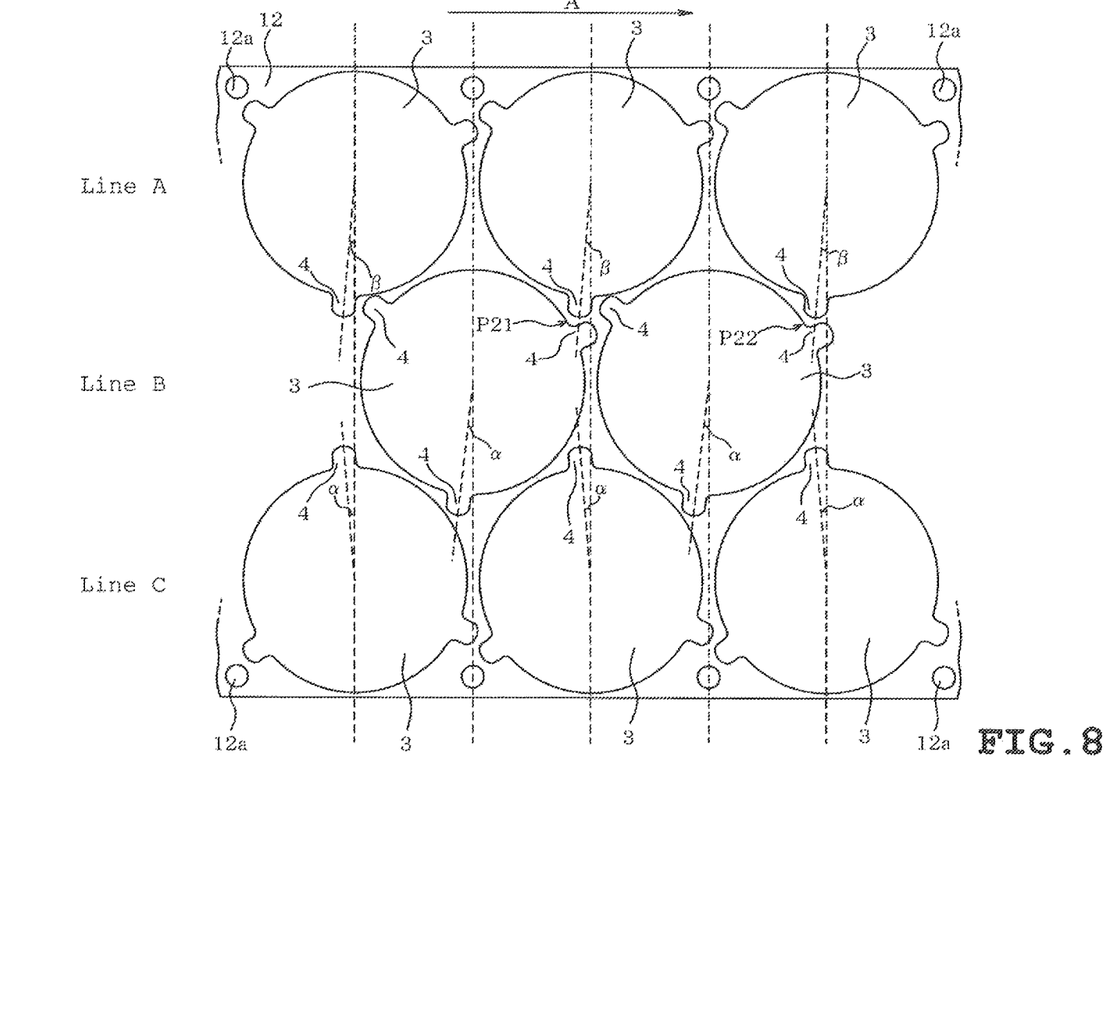
FIG. 8 is a diagram (part 1) showing an example of a layout of dies for punching out the core members for the stator core according to a second embodiment.

In the layout shown in FIG. 8 for example, each of the "projections 4" extending between the core members 3, 3 adjacent to each other along the lengthwise direction of the worked parent material sheet 12 in one of the rows, the row B in this case in the plurality of projections 4 that the core members 3 for the stator core included in one of the other rows formed at one end the opposite ends in the width direction of the worked parent material sheet 12, the row C adjacent to the row B in this case, have, i.e., the "portions from which the projections 4 are punched out", is inclined through the predetermined angle α from the width direction of the worked parent material sheet 12. In addition, each of the "projections 4" extending between the core members 3, 3 adjacent to each other along the lengthwise direction of the worked parent material sheet 12 in one of the rows, the row C in this case in the plurality of projections 4 that the core members 3 for the stator core included in one of the other rows formed at the center in the width direction of the worked parent material sheet 12, i.e., the row B in this case, have, i.e., the "portions from which the projections 4 are punched out", is inclined through the predetermined angle α from the width direction of the worked parent material sheet 12. In this case "5°" is set as predetermined angle α in each of the row C and the row B.

In addition, each of the "projections 4" extending between the core members 3, 3 adjacent to each other along the lengthwise direction of the worked parent material sheet 12 in one of the rows, the row B in this case in the plurality of projections 4 that the core members 3 for the stator core included in one of the other rows formed at the other end in the width direction of the worked parent material sheet 12, the row A adjacent to the row B in this case, have, i.e., the "portions from which the projections 4 are punched out", is inclined through the predetermined angle β from the width direction of the worked parent material sheet 12. In this case "6°" is set as predetermined angle β. In this layout, the "projections 4" of the core members 3 belonging to the row A, i.e., the "portions from which the projections 4 are punched out", and the "projections 4" of the core members 3 belonging to the row B different from the row A, i.e., the "portions from which the projections 4 are punched out", are close to each other, for example, at positions P21 and P22, but no portions exist where the "core members 3" belonging to different ones of the rows, i.e., the "portions from which the core members 3 are punched out", interfere with each other or no positions exist at which the "core members 3" or the "portions from which the core members 3 are punched out" are extremely close to each other. As a result, the yield of the worked parent material sheet 12 provided as material can be markedly improved.

Figure 9:
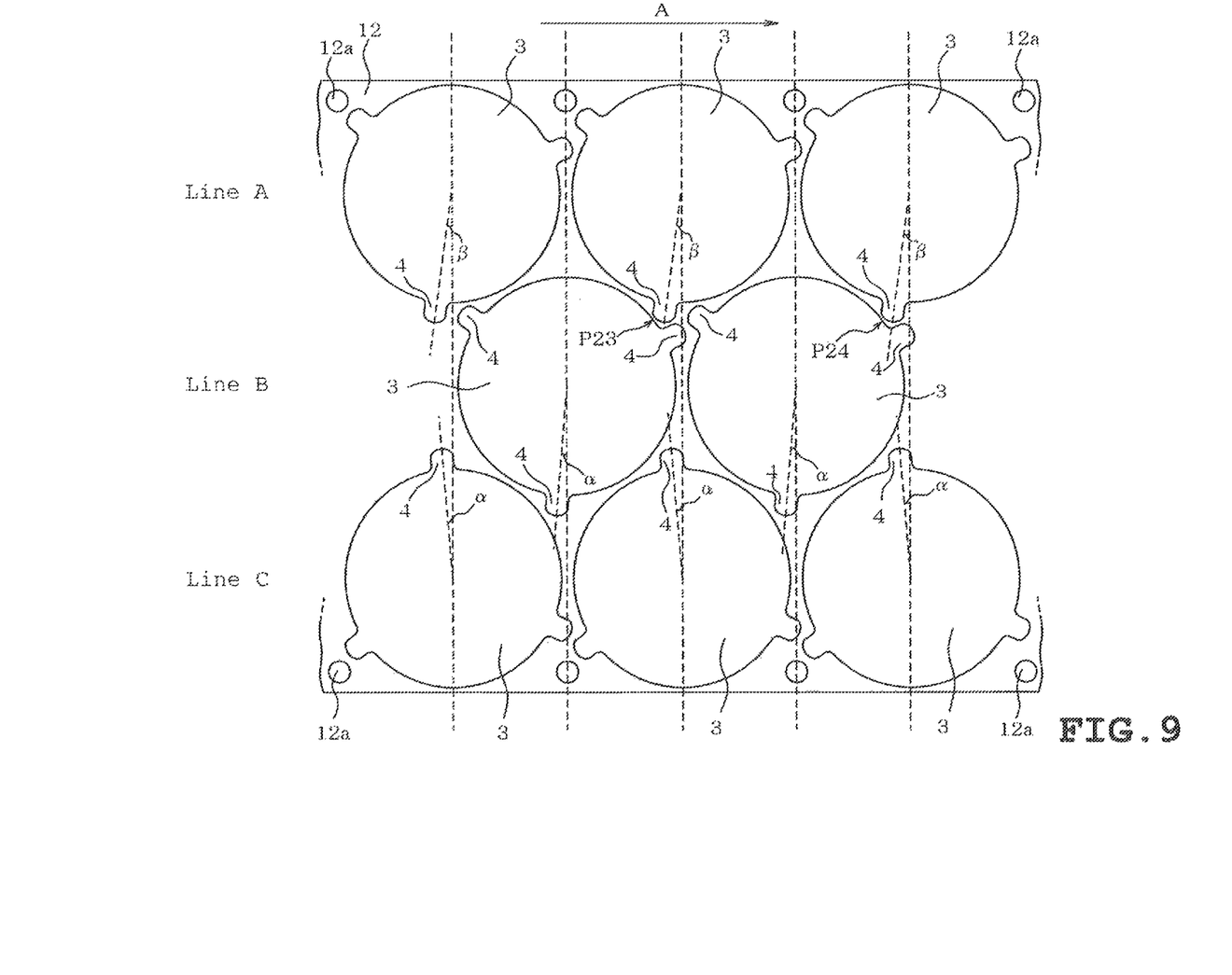
FIG. 9 is a diagram (part 2) showing an example of a layout of dies for punching out the core members for the stator core.

In the layout shown in FIG. 9 for example, each of the "projections 4" extending between the core members 3, 3 adjacent to each other along the lengthwise direction of the worked parent material sheet 12 in one of the rows, the row B in this case in the plurality of projections 4 that the core members 3 for the stator core included in one of the other rows formed at one end in the width direction of the worked parent material sheet 12, the row C adjacent to the row B in this case, have, i.e., the "portions from which the projections 4 are punched out", is inclined through the predetermined angle α from the width direction of the worked parent material sheet 12. In addition, each of the "projections 4" extending between the core members 3, 3 adjacent to each other along the lengthwise direction of the worked parent material sheet 12 in one of the rows, the row C in this case in the plurality of projections 4 that the core members 3 for the stator core included in one of the other rows formed at the center in the width direction of the worked parent material sheet 12, i.e., the row B in this case, have, i.e., the "portions from which the projections 4 are punched out", is inclined through the predetermined angle α from the width direction of the worked parent material sheet 12. In this case "5°" is set as predetermined angle α in each of the row C and the row B.

Each of the "projections 4" extending between the core members 3, 3 adjacent to each other along the lengthwise direction of the worked parent material sheet 12 in one of the rows, the row B in this case in the plurality of projections 4 that the core members 3 for the stator core included in one of the other rows formed at the other end in the width direction of the worked parent material sheet 12, the row A adjacent to the row B in this case, have, i.e., the "portions from which the projections 4 are punched out", is inclined through the predetermined angle β from the width direction of the worked parent material sheet 12. In this case "8°" is set as predetermined angle β. In this layout, the "projections 4" of the core members 3 belonging to the row A, i.e., the "portions from which the projections 4 are punched out", and the "projections 4" of the core members 3 belonging to the row B different from the row A, i.e., the "portions from which the projections 4 are punched out", are close to each other, for example, at positions P23 and P24, but no portions exist where the "core members 3" belonging to different ones of the rows, i.e., the "portions from which the core members 3 are punched out", interfere with each other or no positions exist at which the "core members 3" or the "portions from which the core members 3 are punched out" are extremely close to each other. As a result, the yield of the worked parent material sheet 12 provided as material can be markedly improved.

In the punching step of punching out from the worked parent material sheet 12 in band form the core members 3 each having the plurality of connecting projections 4 projecting radially outward from its outer periphery in the stator core manufacturing method according to the present embodiment, the portions of the worked parent material sheet 12 from which the core members 3 are punched out are arranged in three rows placed side by side along the width direction of the worked parent material sheet 12. Each of the portions which are included in two of the three rows and from which the projections 4 of the core members 3 are punched out is inclined through the predetermined angle α from the width direction of the worked parent material sheet 12 while each of the portions which are included in the remaining one of the rows and from which the projections 4 of the core members 3 are punched out is inclined through predetermined angle β different from the predetermined angle α from the width direction of the worked parent material sheet 12.

Also, in the present embodiment, each of the portions which are included in one row formed at one end in the width direction of the worked parent material sheet 12 and in one row formed at the center in the width direction of the worked parent material sheet 12 and from which the projections 4 of the core members 3 are punched out is inclined through the predetermined angle α from the width direction of the worked parent material sheet 12. This manufacturing method enables the portions of the worked parent material sheet 12 from which the core members 3 in the rows are punched out to be brought as close as possible to each other while securing a suitable spacing therebetween. Therefore, the area of the portions from which the core members 3 are punched out in the area of the worked parent material sheet 12 can be increased and the amount of the material remaining after punching out the core members 3 can be reduced. Consequently, the yield of the worked parent material sheet 12 provided as material can be markedly improved.

The stacking method described with respect to the first embodiment may also be adopted in a case where the core members 3 obtained in the second embodiment are stacked.

The present invention is not limited to the above-described embodiments. For example, modifications or expansions described below can be made.

In each of the above-described embodiments, the predetermined angle α, which is an example of the first angle, may be set by being adjusted as desired, for example, to an angle in the range from "5°" to "8°". The predetermined angle β, which is an example of the second angle, may also be set by being adjusted as desired, for example, to an angle in the range from "5°" to "8°" different from the predetermined angle α. The "projections 4", i.e., the "portions from which the projections 4 are punched out", in the worked parent material sheet 12 may be inclined in the direction of arrow A in which the worked parent material sheet 12 runs. The number of projections 4 that each core member 3 has is not limited to three. Each core member 3 may have, for example, two, four or a number larger than four of projections.

The spacing between the "core members 3" belonging to different ones of the rows, i.e., the "portions from which the core members 3 are punched out", namely, the width of the "remaining material" remaining after punching, may be set so that a size of about 5 to 10 times the sheet thickness of the worked parent material sheet 12 can be secured in the narrowest place. This setting ensures that portions other than the portions from which the core members 3 are punched out remain by connecting one to another in the material remaining after the core members 3 are punched out from the worked parent material sheet 12. That is, because portions of the remaining material connect integrally to each other, the slack in the worked parent material sheet 12 and the remaining material can be minimized, for example, by pulling the worked parent material sheet 12 and the remaining material in the direction of arrow A from the downstream side, thereby facilitating the feed of the worked parent material sheet 12 and the remaining material in the direction of arrow A.

In the punching step of punching out from the electrical steel sheet in band form the core members each having the plurality of connecting projections projecting radially outward from its outer periphery in the stator core manufacturing method according to the embodiments described above, the portions of the electrical steel sheet from which the core members are punched out are arranged in three rows placed side by side along the width direction of the electrical steel sheet. Each of the portions which are included in two of the three rows and from which the projections of the core members are punched out is inclined through the first angle from the width direction of the electrical steel sheet while each of the portions which are included in the remaining one of the rows and from which the projections of the core members are punched out is inclined through the second angle different from the first angle from the width direction of the electrical steel sheet. This manufacturing method enables the portions of the electrical steel sheet from which the core members in the rows are punched out to be brought as close as possible to each other while securing a suitable spacing therebetween, thus ensuring that the yield of the electrical steel sheet provided as material can be markedly improved.

The embodiments have been exhibited as examples and are not intended to limit the scope of the invention. These new embodiments can be implemented in other various forms. Various omissions, replacements and changes can be made in the embodiments within such a scope as not to depart from the gist of the invention. The embodiments and modifications to the embodiments are included in the scope and gist of the invention and in the invention described in the appended claims and a scope equivalent thereto.

The invention claimed is:

1. A method of manufacturing a stator core comprising:
punching out core members from an electrical steel sheet, each of the core members having a plurality of connecting projections, the connecting projections projecting radially outward from an outer periphery of the core member; and
stacking the punched out core members to form the stator core; wherein:
the core members are punched in an arrangement of three rows, the rows being placed side by side along a width direction of the electrical steel sheet; and
each of the core members in two of the three rows has a connecting projection angled at a first angle from the width direction of the electrical steel sheet, and each of the core members in a third row on the electrical steel sheet has a connecting projection angled at a second angle different from the first angle from the width direction of the electrical steel sheet.

2. The method of manufacturing a stator core according to claim 1, wherein the two of the three rows are formed at opposite ends in the width direction of the electrical steel sheet.

3. The method of manufacturing a stator core according to claim 1, wherein one of the two of the three rows is formed at one end in the width direction of the electrical steel sheet and one of the two of the three rows is formed at a center in the width direction of the electrical steel sheet.

4. The method of manufacturing a stator core according claim 1, wherein each of the first angle and the second angle is set to an angle in the range from 5° to 8°.

* * * * *